(12) United States Patent
Feng et al.

(10) Patent No.: US 10,732,944 B1
(45) Date of Patent: Aug. 4, 2020

(54) GENERIC VERIFICATION APPROACH FOR PROTOBUF BASED PROJECTS

(71) Applicant: Baidu USA LLC, Sunnyvale, CA (US)

(72) Inventors: Qian Feng, Sunnyvale, CA (US);
Yulong Zhang, Sunnyvale, CA (US);
Pei Wang, Sunnyvale, CA (US); Yu Ding, Sunnyvale, CA (US); Tao Wei, Sunnyvale, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 0 days.

(21) Appl. No.: 16/411,755

(22) Filed: May 14, 2019

(51) Int. Cl.
*G06F 9/44* (2018.01)
*G06F 8/41* (2018.01)
*G06F 16/22* (2019.01)
*G06F 9/54* (2006.01)

(52) U.S. Cl.
CPC .............. *G06F 8/427* (2013.01); *G06F 9/544* (2013.01); *G06F 9/546* (2013.01); *G06F 16/2246* (2019.01)

(58) Field of Classification Search
None
See application file for complete search history.

(56) References Cited

U.S. PATENT DOCUMENTS

2002/0120922 A1* 8/2002 Williams ................. G06F 30/33 717/143
2016/0283539 A1* 9/2016 van Oortmerssen ........ G06F 16/2282

OTHER PUBLICATIONS

Google, "Protocol Buffers: C++ Generated Code," 2014 (Year: 2014).*
Bowring, Packaging Generated Code for gRPC Services (Year: 2018).*
"Serializing your data with Protobuf," Mar. 6, 2019 (Year: 2019).*
"Error including pb.h headers in a MSVC CLR project." Oct. 2018 (Year: 2018).*
"A gRPC C++ introduction," Dec. 2018 (Year: 2018).*

* cited by examiner

*Primary Examiner* — Insun Kang
(74) *Attorney, Agent, or Firm* — Womble Bond Dickinson (US) LLP

(57) ABSTRACT

A method, apparatus, and system for using a verification substitute header file in a verification of an application that uses Protocol Buffers (Protobuf) for data communication is disclosed. The operations comprise: obtaining one or more Protobuf message types from a Protobuf definition file; generating the verification substitute header file based on the Protobuf message types; adding one or more verification stubs to the verification substitute header file; including the verification substitute header file in source code of the application; and performing the verification of the application including the verification substitute header file.

20 Claims, 9 Drawing Sheets

```
1.  syntax = "proto2";
2.  package test;
3.  message MsgType1 {
4.    required int32 value = 1;
5.  }
6.  message MsgType2 {
7.    required bool value = 1;
8.  }
```

FIG. 1B
(Prior Art)

Table 1. Field ID semantics

| Id | Semantics | ID | Semantics |
|---|---|---|---|
| 1 | name | 3 | Number of fields |
| 1 | Proto file name | 4 | Label (optional, required, repeated) |
| 2 | Package name | 5 | Field type |

FIG. 3B

Table 2. Field type ID semantics

| ID | Semantics | ID | Semantics |
|---|---|---|---|
| 1 | Double | 12 | bytes |
| 2 | Float | 13 | UINT32 |
| 3 | Int64 | 14 | ENUM |
| 4 | UINT64 | | |
| 5 | INT32 | | |
| 6 | FIXED64 | | |
| 7 | FIXED32 | | |
| 8 | BOOL | | |
| 9 | String | | |
| 10 | Group | | |
| 11 | Message | | |

FIG. 3C

```
1. 1 {
2.   1: "example.proto"
3.   2: "test"
4.   4 {
5.     1: "MsgType1"
6.     2 {
7.       1: "value"
8.       3: 1
9.       4: 2
10.      5: 5
11.    }
12.  }
13.  4 {
14.    1: "MsgType2"
15.    2 {
16.      1: "value"
17.      3: 1
18.      4: 2
19.      5: 8
20.    }
21.  }
22. }
```

FIG. 3D

GENERIC VERIFICATION APPROACH FOR PROTOBUF BASED PROJECTS

TECHNICAL FIELD

Embodiments of the present disclosure relate generally to software development. More particularly, embodiments of the disclosure relate to using a verification substitute header file in the verification of an application that uses Protobuf.

BACKGROUND

Protocol Buffers (Protobuf), developed by Google, is a language- and platform-neutral method of serializing structured data. It is useful in developing programs to communicate with each other over a wire or for storing data.

A growing number of artificial intelligence (AI) applications (e.g., AI programs for operating autonomous vehicles) are making use of Protobuf. Verification and validation (e.g., for memory safety) of such AI applications using automated verification and validation tools can be slow and time-consuming due to the complexity of the Protobuf header files generated by a standard Protobuf code generator, such as the Protobuf code generator offered by Google.

BRIEF DESCRIPTION OF THE DRAWINGS

Embodiments of the disclosure are illustrated by way of example and not limitation in the figures of the accompanying drawings in which like references indicate similar elements.

FIG. 1B shows an example of a Protobuf definition file.

FIGS. 3B and 3C are data structures defining certain fields corresponding to FIG. 3A according to one embodiment.

FIG. 3D shows equivalent code corresponding to the example AST of FIG. 3A according to one embodiment.

DETAILED DESCRIPTION

Figure 1A:
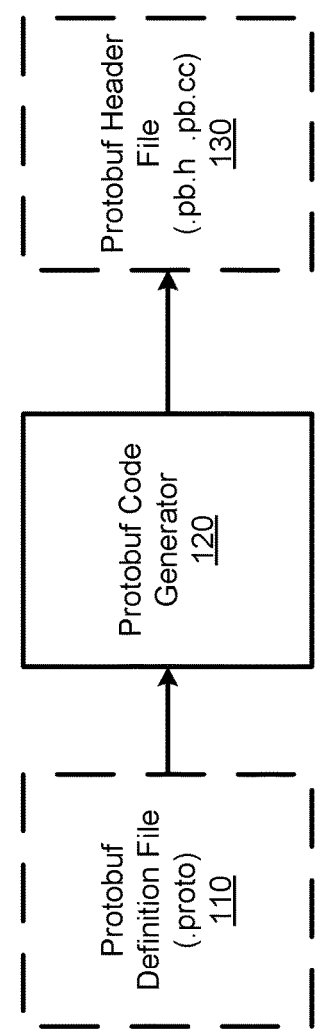
FIG. 1A is a block diagram illustrating a process to generate a Protobuf header file.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

According to some embodiments, a verification substitute header file is used in a verification of an application that uses Protocol Buffers (Protobuf) for data communication. One or more Protobuf message types are obtained from a Protobuf definition file. The Protobuf definition file is compatible with the Protobuf specification, which defines one or more functions that will be invoked during the execution of the corresponding source code. The verification substitute header file is generated based on the Protobuf message types, where the verification substitute header file defines one or more functions that are invoked using a standard C/C++ library, instead of proprietary libraries of Protobuf. The proprietary libraries of Protobuf are difficult to verify. One or more verification stubs are added to the verification substitute header file. The verification substitute header file is included in source code of the application. Thereafter, the verification of the application including the verification substitute header file is performed, including verifying the source code of the functions of the standard C/C++ library invoked based on the verification substitute header file.

In one embodiment, obtaining the one or more Protobuf message types from the Protobuf definition file includes generating an abstract syntax tree (AST) based on the Protobuf definition file and parsing the AST. In one embodiment, a C++ class is created in the verification substitute header file for each Protobuf message type, and one member field and a corresponding member function are generated in the C++ class for each field of the corresponding Protobuf message type.

In one embodiment, the verification of the application including the verification substitute header file relies on a C/C++ Standard Library to create, access, or delete one or more objects of the C++ class. In one embodiment, the verification stubs comprise one or more preconditions associated with the member function, one or more postconditions associated with the member function, or a combination thereof. In one embodiment, the one or more preconditions and/or the one or more postconditions are customizable. In one embodiment, the Protobuf message types are defined in the Protobuf definition file.

Referring to FIG. 1A, a block diagram 100 illustrating a process to generate a Protobuf header file is shown. A developer defines the structured data, or messages, in a Protobuf definition file 110 (usually with a filename extension of .proto) with the Protobuf interface description language. Hereinafter the Protobuf definition file 110 may also be referred to simply as a proto file. The Protobuf definition file 110 is compatible with the Protobuf specification, which is associated with a set of Protobuf libraries defined by Google. A Protobuf code generator 120 generates one or more Protobuf header files 130 based on the Protobuf definition file 110. A standard Protobuf code generator 120 is available from Google. For example, with the C/C++ language, the Protobuf code generator 120 produces a header file (with the extension .pb.h) and an implementation file (with the extension .pb.cc) from the Protobuf definition file 110. Thereafter, the header files 130 can be included by the developer in an application, which enables the application to read and write Protobuf messages in accordance with the message type definition included in the Protobuf definition file 110.

For illustration purposes, a simple example Protobuf definition file 110 named example.proto is provided in FIG.

1B. In this example, the example.proto file defines the two message types: MsgType1 and MsgType2, where MsgType1 includes a required 32-bit integer value, and MsgType2 includes a required Boolean value.

The example.pb.h header file listed in Appendix A at the end of this document is an example header file produced by Google's standard Protobuf code generator based on the example.proto definition file as shown in FIG. 1B. It can be seen that example.pb.h header file depends heavily on the proprietary libraries (e.g., libraries whose header files listed on lines 1 to 7) from Google's implementation of Protobuf, which could greatly increase the workload involved in the verification process, since the verification process would have to delve into Google's Protobuf libraries and verify corresponding functions.

A growing number of artificial intelligence (AI) applications (e.g., AI programs for operating autonomous vehicles) are making use of Protobuf. Verification and validation (e.g., for memory safety) of such AI applications using automated verification and validation tools can be slow and time-consuming due to the complexity of the Protobuf header files generated by a standard Protobuf code generator. In particular, the Protobuf header files generated by a standard Protobuf code generator are complex because they have been generated with data structures from standard Protobuf libraries. Therefore, including the Protobuf header files generated by a standard Protobuf code generator in an application to be verified and validated may unnecessarily slow down the verification and validation process.

Figure 2:
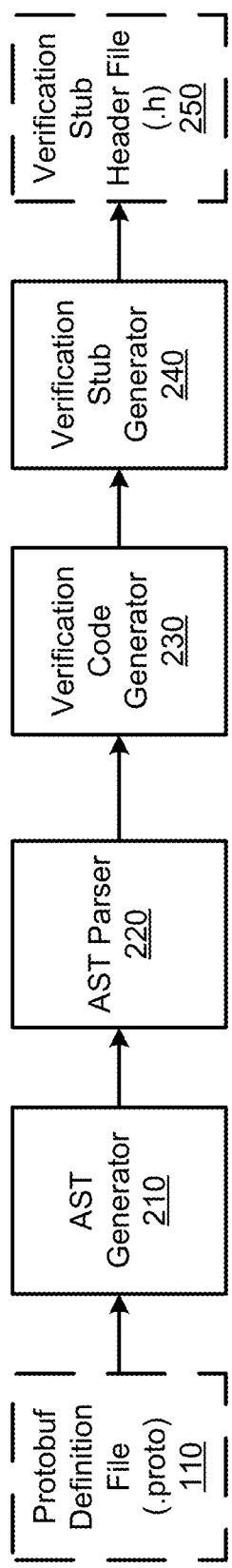
FIG. 2 is a block diagram illustrating a process of generating a verification substitute header file according to one embodiment.

Referring to FIG. 2, a block diagram 200 illustrating a process of generating a verification substitute header file according to one embodiment is shown. An abstract syntax tree (AST) generator 210 analyzes the Protobuf definition file 110 to generate an AST that describes the message types defined in the Protobuf definition file 110. An AST parser 220 then parses the AST to obtain all the Protobuf message types, including all fields in each Protobuf message type. It should be appreciated that the Protobuf message types so obtained would be consistent with those defined in the Protobuf definition file 110 based on which the AST is generated.

Once the Protobuf message types are obtained, a verification code generator 230 generates one or more C++ classes based on the Protobuf message types. In particular, at least one C++ class is generated for each Protobuf message type. For each field in a Protobuf message type, the verification code generator 230 generates a member field as well as a member function to access the member field in the C++ class corresponding to the Protobuf message type. The C++ classes, including the data members and function members, are saved in the verification substitute header file 250.

Furthermore, in order so that the verification substitute header file 250 is verifiable, a verification stub generator 240 adds verification stubs to the verification substitute header file 250. The verification stubs include preconditions and/or postconditions for at least one member function to ensure its memory safety, etc. For example, the preconditions may include: 1) If the input parameter of the function is a pointer, it should not be a NULL pointer; and 2) The input parameter of the function should not exceed the range of the respective primitive type (e.g., primitive types such as integer, float, double, etc., have defined ranges). In another embodiment, an example precondition may be that the input value should be within a particular range. One example of a postcondition may be that the output value must be within a particular range. The example preconditions and postconditions described herein are illustrative, and do not limit the disclosure. In different embodiments, the preconditions and postconditions may be customized in different ways. In addition, the preconditions and postconditions can be defined in any suitable format. In one embodiment, the ANSI/ISO C Specification Language (ACSL) is used to define the preconditions and postconditions.

Thus, because standard C++ classes are used, only the C/C++ standard library (e.g., stdlibc++) would be relied on to create, access, or delete objects when the verification substitute header file 250 is included in the application at the time of verification and validation, and the more complex Protobuf-specific code, functions, and libraries are not used at the time of verification and validation.

An example verification substitute header file 250 named verification_example.h that corresponds to the example.proto definition file above is provided in Appendix B at the end of this document for illustration purposes. It can be seen that compared to those in the example.pb.h header file in Appendix A, all the necessary methods for each message type has been greatly simplified. Verification checks relating to preconditions and postconditions are added to functions with parameters. In particular, a pointer check is added to functions that have pointers as their arguments. For example, as shown on lines 46-47 of Appendix B, a verification sub "/*@ requires \valid(x) */" has been inserted. Similarly, line 81 requires verification of variable "from" while line 86 require verification of variable "other." Such a verification stub instructs the verification process to verify variable "x" is a valid pointer. If the verification fails (e.g., pointer x is an invalid pointer), an alert may be generated to notify a user. The conditions follow the ACSL format. Accordingly, the verification process will automatically check and verify whether the conditions are satisfied. It is within the skills of a person of ordinary skill in the art to generate an AST based on a Protobuf definition file.

Figure 3A:
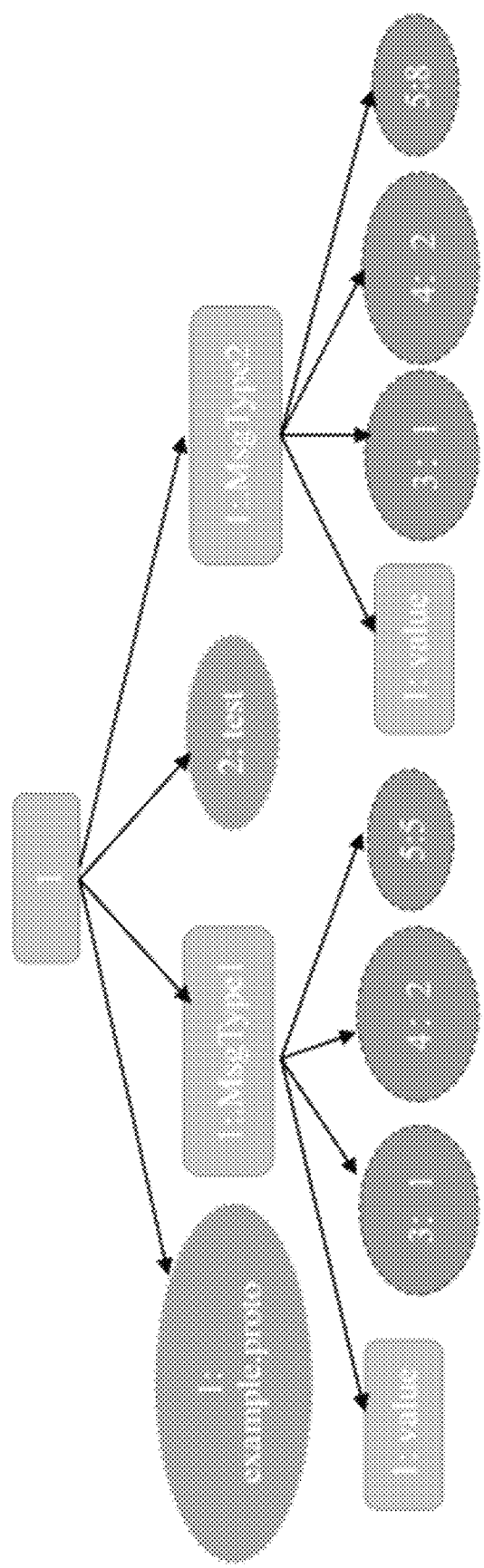
FIG. 3A is a diagram illustrating an example AST corresponding to the example.proto Protobuf definition file according to one embodiment.

Referring to FIG. 3A, a diagram illustrating an example AST 300 corresponding to the example.proto definition file is shown. The AST 300 includes information relating to the Protobuf definition file name ("1: example.proto"), the package name ("2: test"), and the two defined message types (i.e., MsgType1 and MsgType2) (nodes "3:1": both message types have 1 field; nodes "4:2": both message types have a "required" label; nodes "5:5" and "5:8": the field type is int32 and bool, respectively). Similar to the key-value pairs, according to one embodiment, numbers are utilized to enumerate representing the keys (e.g., field IDs as shown in FIG. 3B) and its associated values (e.g., field types as shown in FIG. 3C). An AST parser may parse the AST to obtain all the Protobuf message types, including all fields in each Protobuf message type. An equivalent code representation of the AST is provided in FIG. 3D for illustration purposes.

Figure 4:
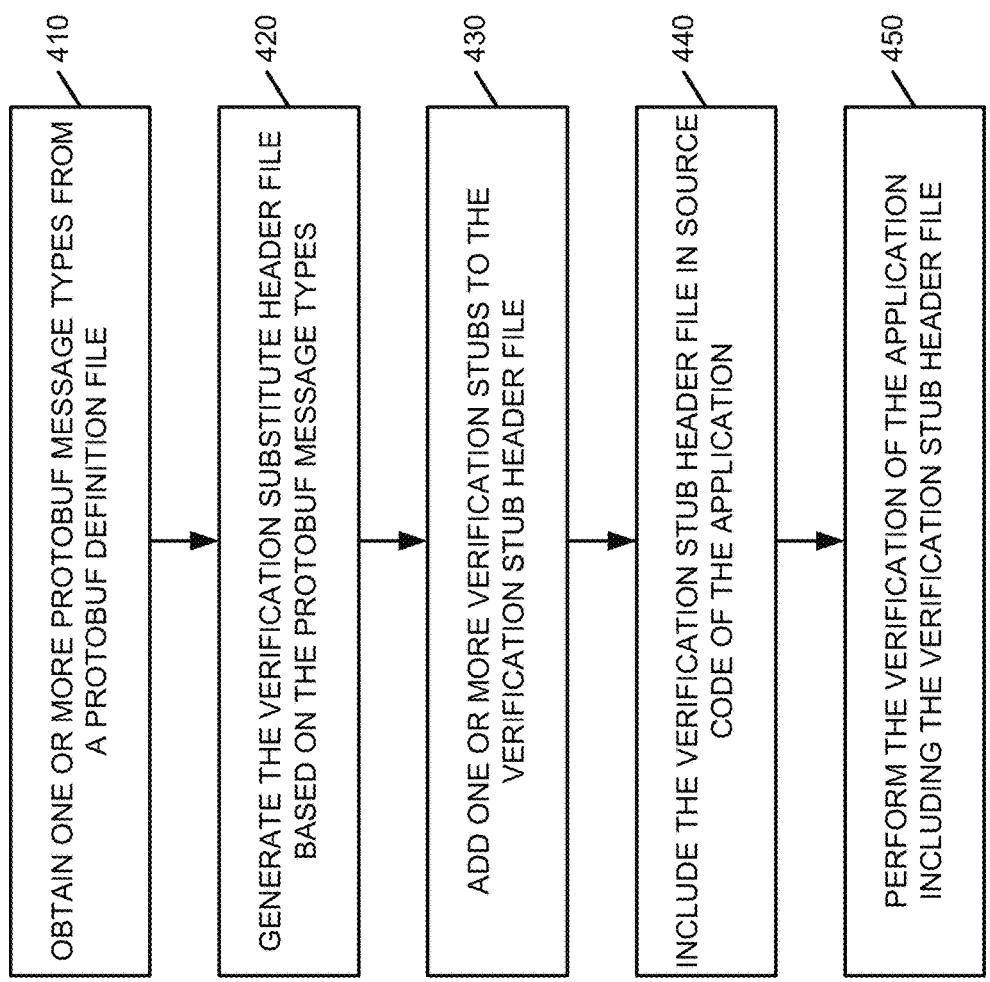
FIG. 4 is a flowchart illustrating a method for using a verification substitute header file in a verification of an application that uses Protobuf for data communication according to one embodiment.

Referring to FIG. 4, a flowchart illustrating a method 400 for using a verification substitute header file in a verification of an application that uses Protobuf for data communication is shown. The method 400 can be implemented in hardware, software, or a combination thereof. At block 410, one or more Protobuf message types are obtained based on a Protobuf definition file (e.g., a Protobuf compatible definition file). At block 420, the verification substitute header file is generated based on the Protobuf message types, which is compatible with standard C/C++ header files. At block 430, one or more verification stubs are added to the verification substitute header file. At block 440, the verification substitute header file is included in source code of the application. At block 450, the verification of the application including the verification substitute header file is performed by only verifying standard C/C++ libraries without having to verify the proprietary libraries of Protobuf.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

It should be appreciated that although some embodiments have been described with reference to the C++ programming language, the programming language does not limit the disclosure, and embodiments of the disclosure can be adapted for other programming languages without deviating from the scope of the disclosure.

Figure 5:
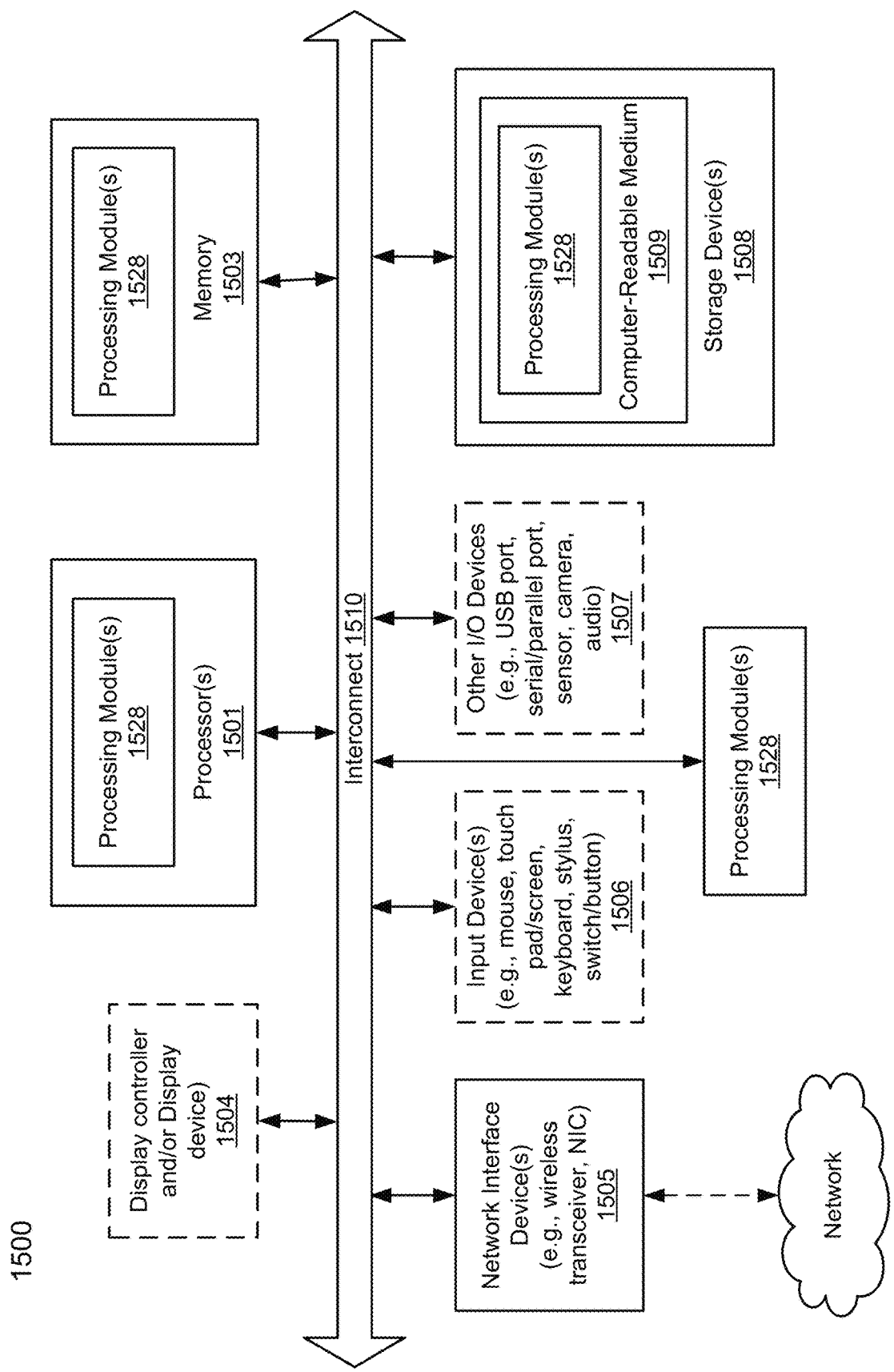
FIG. 5 is a block diagram illustrating a data processing system according to one embodiment.

FIG. 5 is a block diagram illustrating an example of a data processing system which may be used with one embodiment of the disclosure. For example, system 1500 may represent any of data processing systems described above performing any of the processes or methods described above, such as, for example, AST generator 210, AST parser 220, verification code generator 230, and verification stub generator 240 of FIG. 2. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system.

Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a Smartwatch, a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 connected via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Robot Operating System (ROS), Windows® operating system from Microsoft, Mac OS®/iOS® from Apple, Android® from Google®, LINUX, UNIX, or other real-time or embedded operating systems.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including BIOS as well as other firmware of the system.

Storage device 1508 may include computer-accessible storage medium 1509 (also known as a machine-readable storage medium or a computer-readable medium) on which is stored one or more sets of instructions or software (e.g., module, unit, and/or logic 1528) embodying any one or more of the methodologies or functions described herein. Processing module/unit/logic 1528 may represent any of the components described above, such as, for example, AST generator 210, AST parser 220, verification code generator 230, and verification stub generator 240. Processing module/unit/logic 1528 may also reside, completely or at least partially, within memory 1503 and/or within processor 1501 during execution thereof by data processing system 1500, memory 1503 and processor 1501 also constituting machine-accessible storage media. Processing module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present disclosure. The term "computer-readable storage medium" shall accordingly be taken to include, but not be limited to, solid-state memories, and optical and magnetic media, or any other non-transitory machine-readable medium.

Processing module/unit/logic 1528, components and other features described herein can be implemented as discrete hardware components or integrated in the functionality of hardware components such as ASICS, FPGAs, DSPs or similar devices. In addition, processing module/unit/logic 1528 can be implemented as firmware or functional circuitry within hardware devices. Further, processing module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present disclosure. It will also be appreciated that network computers, handheld computers, mobile phones, servers, and/or other data processing systems which have fewer components or perhaps more components may also be used with embodiments of the disclosure.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

Appendix A
example.pb.h

```
1.   #include <string>
2.   #include <google/protobuf/stubs/common.h>
3.   #include <google/protobuf/generated_message_util.h>
4.   #include <google/protobuf/message.h>
5.   #include <google/protobuf/repeated_field.h>
6.   #include <google/protobuf/extension_set.h>
7.   #include <google/protobuf/unknown_field_set.h>
8.   namespace test {
9.   void protobuf_AddDesc_example_2eproto( );
10.  void protobuf_AssignDesc_example_2eproto( );
11.  void protobuf_ShutdownFile_example_2eproto( );
12.
13.  class MsgType1;
14.  class MsgType1 : public ::google::protobuf::Message {
15.    public:
16.    MsgType1( );
17.    virtual ~MsgType1( );
18.    MsgType1(const MsgType1& from);
19.    inline MsgType1& operator=(const MsgType1& from) {
20.       CopyFrom(from);
21.       return *this;
22.    }
23.    inline const ::google::protobut:UnknownFieldSet& unknown_fields( ) const {
24.       return _unknown_fields_;
25.    }
26.    inline ::google::protobut:UnknownFieldSet* mutable_unknown_fields( ) {
27.       return &_unknown_fields_;}
28.    static const ::google::protobut:Descriptor* descriptor( );
29.  static const MsgType1& default_instance( );
30.    void Swap(MsgType1* other);
31.    MsgType1* New( ) const;
32.    void CopyFrom(const ::google::protobut:Message& from);
33.    void MergeFrom(const ::google::protobut:Message& from);
34.    void CopyFrom(const MsgType1& from);
35.    void MergeFrom(const MsgType1& from);
36.    void Clear( );
37.    bool IsInitialized( ) const         ;
38.    int ByteSize( ) const;
39.    bool MergePartialFromCodedStream(
40.         ::google::protobufjo::CodedInputStream* input);
41.    void SerializeWithCachedSizes(
42.         ::google::protobuf::io::CodedOutputStream* output) const;
43.    ::google::protobuf::uint8* SerializeWithCachedSizesToArray(::google::protobuf::uint8* output) const;
44.    int GetCachedSize( ) const {return _cached_size_; }
45.    private:
46.    void SharedCtor( );
47.    void SharedDtor( );
48.    void SetCachedSize(int size) const;
49.    public:
50.    ::google::protobuf::Metadata GetMetadata( ) const;
51.    inline bool has_value( ) const;
52.    inline void clear_value( );
53.    static const int kValueFieldNumber = 1;
54.    inline ::google::protobuf::int32 value( ) const;
55.    inline void set_value(::google::protobut:int32 value);
56.    private:
57.    inline void set_has_value( );
58.    inline void clear_has_value( );
59.    ::google::protobuf::UnknownFieldSet _unknown_fields_;
60.    ::google::protobut:uint32 _has_bits_[1];
61.    mutable int _cached_size_;
62.    ::google::protobut:int32 value_;
63.    friend void protobuf_AddDesc_example_2eproto( );
64.    friend void protobuf_AssignDesc_example_2eproto( );
65.    friend void protobuf_ShutdownFile_example_2eproto( );
```

Appendix A
example.pb.h

```
66.     void InitAsDefaultInstance( );
67.     static MsgType1* default_instance_;
68.  },
```

Appendix B
verification.example.h

```
 1.  #include <vector>
 2.  #include <iosfwd>
 3.  namespace test {
 4.
 5.  #ifndef test_Adapter
 6.  #define test_Adapter
 7.  template<size_t S> struct bool_adaptor {};
 8.  template<> struct bool_adaptor<1> {using type = uint8_t; };
 9.  template<> struct bool_adaptor<2> {using type = uint16_t; };
10.  template<> struct bool_adaptor<4> {using type = uint32_t; };
11.  template<> struct bool_adaptor<8> {using type = uint64_t; };
12.
13.  template<typename T>
14.  struct vec_functor {
15.    using type = std::vector<T>;
16.  };
17.  template<>
18.  struct vec_functor<bool> {
19.    using type = std::vector<typename bool_adaptor<sizeof(bool)>::type>;
20.  };
21.
22.  template<typename T> struct argument_type {};
23.  template<typename U, typename T> struct argument_type<U(T)>{
24.    using type = T;
25.  };
26.
27.  #endif
28.
29.  #define PROTO_TY(TYPE) typename argument_type<void(TYPE)>::type
30.
31.  #define PROTO_FIELD(TYPE, NAME)                               \
32.  private:                                                     \
33.    PROTO_TY(TYPE)_ ## NAME;                                   \
34.  public:                                                     \
35.    PROTO_TY(TYPE)* mutable_ ##NAME( ) {return &_ ## NAME;   } \
36.    void set_ ##NAME(const PROTO_TY(TYPE) &x) {_ ## NAME = x; } \
37.    const PROTO_TY(TYPE) &NAME( ) const {return _ ## NAME; }   \
38.    void clear_ ## NAME( ) {return;}                           \
39.
40.  #define REPEATED_PROTO_FIELD(TYPE, NAME)                    \
41.    PROTO_FIELD(vec_functor<TYPE>::type, NAME)                \
42.    TYPE * add ## NAME( ) {                                   \
43.      _ ## NAME.push_back(TYPE( ));                           \
44.      return reinterpret_cast<TYPE*>(&_ ## NAME.back( ));    \
45.    }                                                         \
46.  /*@ requires \valid(x)
47.  */
48.    TYPE *add_ ## NAME(const TYPE &x) {                       \
49.      _ ## NAME.push_back(x);                                 \
50.      return reinterpret_cast<TYPE *>(&_ ## NAME.back( ));   \
51.    }                                                         \
52.  /*@ requires \valid(x)
53.  */
54.    int NAME ## _size( ) const {return 1;}                   \
55.    const TYPE & NAME(int index) const {                     \
56.      return _ ## NAME[index];                                \
57.    }
58.
59.  #define PARSING_MEMBERS(PROTO)                              \
60.  public:                                                     \
61.
62.  #define STR          DateTypeProto_STR
63.  #define INT32        DateTypeProto_INT32
64.  #define FLOAT        DateTypeProto_FLOAT
65.  #define DOUBLE       DateTypeProto_DOUBLE
66.  #define BOOLEN       DateTypeProto_BOOLEN
```

Appendix B
verification.example.h

```
67.  #define CACHE_LIST    DateTypeProto_CACHE_LIST
68.  #define TENSOR        DateTypeProto_TENSOR
69.
70.
71.  /* Struct definitions */
72.
73.  class MsgType1 {
74.  public:
75.      MsgType1( ){};
76.      MsgType1(const MsgType1&){};
77.      ~MsgType1( ){};
78.      PROTO_FIELD(int32_t, value);
79.      PARSING_MEMBERS(MsgType1);
80.  public:
81.      /*@ requires \valid(from)
82.      */
83.      void CopyFrom(const MsgType1& from) {
84.         this->_value = std::move(from.value( ));
85.      };
86.      /*@ requires \valid(other)
87.      */
88.      MsgType1& operator = (const MsgType1 &other) {
89.         CopyFrom(other);
90.         return *this;
91.      };
92.      std::string DebugString( ) const {
93.         std::string debug_info = std::string(" this is a debug info from class MsgType1 ");
94.         return debug_info;
95.      };
96.      std::string ShortDebugString( ) const {
97.         std::string debug_info = std::string(" this is a debug info from class MsgType1 ");
98.         return debug_info;
99.  };
100.     void Clear( ) {
101.        return;
102.     };
103.     std::string GetTypeName( ) const{
104.        return std::string(" MsgType1 ");
105.     }
106.     std::string SerializeAsString( ) const {
107.        return std::string(" MsgType1 ");
108.     }
109. };
```

What is claimed is:

1. A computer-implemented method for using a verification substitute header file in a verification of an application that uses Protocol Buffers (Protobuf) for data communication, comprising:
obtaining one or more Protobuf message types from a Protobuf definition file that defines a first set of one or more functions according to a Protobuf specification, wherein the functions of the first set invoke a set of Protobuf libraries;
generating the verification substitute header file based on the Protobuf message types, the verification substitute header file defining a second set of one or more functions according to a standard C/C++ programming language, wherein the functions of the second set invoke a set of standard C/C++ libraries;
inserting one or more verification stubs to the verification substitute header file; and
performing the verification of the application including the verification substitute header file based on the set of standard C/C++ libraries without having to verify the set of Protobuf libraries.

2. The method of claim 1, wherein obtaining the one or more Protobuf message types from the Protobuf definition file comprises generating an abstract syntax tree (AST) based on the Protobuf definition file and parsing the AST.

3. The method of claim 1, wherein a C++ class is created in the verification substitute header file for each Protobuf message type, and one member field and a corresponding member function are generated in the C++ class for each field of the corresponding Protobuf message type.

4. The method of claim 3, wherein the verification of the application including the verification substitute header file relies on a C/C++ standard library to create, access, or delete one or more objects of the C/C++ class.

5. The method of claim 3, wherein the verification stubs comprise one or more preconditions associated with the member function, one or more postconditions associated with the member function, or a combination thereof.

6. The method of claim 5, wherein the one or more preconditions and/or the one or more postconditions are customizable.

7. The method of claim 1, wherein the Protobuf message types are defined in the Protobuf definition file.

8. A non-transitory machine-readable medium having instructions stored therein, which when executed by a processor, cause the processor to perform operations for using a verification substitute header file in a verification of an application that uses Protocol Buffers (Protobuf) for data communication, the operations comprising:
obtaining one or more Protobuf message types from a Protobuf definition file that defines a first set of one or more functions according to a Protobuf specification, wherein the functions of the first set invoke a set of Protobuf libraries;

generating the verification substitute header file based on the Protobuf message types, the verification substitute header file defining a second set of one or more functions according to a standard C/C++ programming language, wherein the functions of the second set invoke a set of standard C/C++ libraries;

inserting one or more verification stubs to the verification substitute header file; and performing the verification of the application including the verification substitute header file based on the set of standard C/C++ libraries without having to verify the set of Protobuf libraries.

9. The machine-readable medium of claim 8, wherein obtaining the one or more Protobuf message types from the Protobuf definition file comprises generating an abstract syntax tree (AST) based on the Protobuf definition file and parsing the AST.

10. The machine-readable medium of claim 8, wherein a C++ class is created in the verification substitute header file for each Protobuf message type, and one member field and a corresponding member function are generated in the C++ class for each field of the corresponding Protobuf message type.

11. The machine-readable medium of claim 10, wherein the verification of the application including the verification substitute header file relies on a C/C++ standard library to create, access, or delete one or more objects of the C/C++ class.

12. The machine-readable medium of claim 10, wherein the verification stubs comprise one or more preconditions associated with the member function, one or more postconditions associated with the member function, or a combination thereof.

13. The machine-readable medium of claim 12, wherein the one or more preconditions and/or the one or more postconditions are customizable.

14. The machine-readable medium of claim 8, wherein the Protobuf message types are defined in the Protobuf definition file.

15. A data processing system, comprising:
a processor; and
a memory coupled to the processor to store instructions, which when executed by the processor, cause the processor to perform operations for using a verification substitute header file in a verification of an application that uses Protocol Buffers (Protobuf) for data communication, the operations including
obtaining one or more Protobuf message types from a Protobuf definition file that defines a first set of one or more functions according to a Protobuf specification, wherein the functions of the first set invoke a set of Protobuf libraries,
generating the verification substitute header file based on the Protobuf message types, the verification substitute header file defining a second set of one or more functions according to a standard C/C++ programming language, wherein the functions of the second set invoke a set of standard C/C++ libraries,
inserting one or more verification stubs to the verification substitute header file, and
performing the verification of the application including the verification substitute header file based on the set of standard C/C++ libraries without having to verify the set of Protobuf libraries.

16. The system of claim 15, wherein obtaining the one or more Protobuf message types from the Protobuf definition file comprises generating an abstract syntax tree (AST) based on the Protobuf definition file and parsing the AST.

17. The system of claim 15, wherein a C++ class is created in the verification substitute header file for each Protobuf message type, and one member field and a corresponding member function are generated in the C++ class for each field of the corresponding Protobuf message type.

18. The system of claim 17, wherein the verification of the application including the verification substitute header file relies on a C/C++ standard library to create, access, or delete one or more objects of the C/C++ class.

19. The system of claim 17, wherein the verification stubs comprise one or more preconditions associated with the member function, one or more postconditions associated with the member function, or a combination thereof.

20. The system of claim 19, wherein the one or more preconditions and/or the one or more postconditions are customizable.

* * * * *